US012717266B2

(12) United States Patent
Hamada et al.

(10) Patent No.: US 12,717,266 B2
(45) Date of Patent: Aug. 25, 2026

(54) IMAGE FORMING APPARATUS

(71) Applicant: CANON KABUSHIKI KAISHA, Tokyo (JP)

(72) Inventors: Mikihiko Hamada, Kanagawa (JP); Shuichi Tetsuno, Kanagawa (JP); Toshihiko Takayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/076,311

(22) Filed: Mar. 11, 2025

(65) Prior Publication Data

US 2025/0291300 A1 Sep. 18, 2025

(30) Foreign Application Priority Data

Mar. 14, 2024 (JP) ................................ 2024-039600

(51) Int. Cl.

| | |
|---|---|
| ***G03G 21/00*** | (2006.01) |
| ***G03G 15/02*** | (2006.01) |
| ***G03G 15/06*** | (2006.01) |
| ***G03G 15/08*** | (2006.01) |
| ***G03G 15/16*** | (2006.01) |
| ***G03G 21/06*** | (2006.01) |

(52) U.S. Cl.

CPC ..... *G03G 21/0064* (2013.01); *G03G 15/0266* (2013.01); *G03G 15/065* (2013.01); *G03G 15/0865* (2013.01); *G03G 15/1675* (2013.01); *G03G 21/0082* (2013.01); *G03G 21/06* (2013.01)

(58) Field of Classification Search

None

See application file for complete search history.

(56) References Cited

U.S. PATENT DOCUMENTS 2,990,278 A * 6/1961 Carlson ................ G03G 15/161
118/620
5,426,489 A * 6/1995 Haneda .............. G03G 15/0241
399/175

(Continued)

FOREIGN PATENT DOCUMENTS

JP 2001194951 A 7/2001
JP 2004045570 A 2/2004

(Continued)

*Primary Examiner* — Sevan A Aydin

(74) *Attorney, Agent, or Firm* — Canon U.S.A., Inc. IP Division

(57) ABSTRACT

An image forming apparatus includes an image bearing member, a charging member, a developing member, a transfer member, and a control unit. Following a toner image, which is formed on a surface of the image bearing member at a transfer portion, being transferred to a recording material, residual toner remaining on the surface of the image bearing member is recovered by the developing member. The control unit carries out an image forming operation, a first cleaning operation, and a second cleaning operation. In the first cleaning operation, toner adhering to the charging member is recovered by the developing member, and in the second cleaning operation, the toner adhering to the charging member is discharged to the recording material passing through the transfer portion.

6 Claims, 10 Drawing Sheets

(56) References Cited

U.S. PATENT DOCUMENTS

| | | | | |
|---|---|---|---|---|
| 6,006,055 | A * | 12/1999 | Furuya | G03G 21/0064<br>399/148 |
| 2001/0051061 | A1* | 12/2001 | Bessho | G03G 15/167<br>399/175 |
| 2018/0024495 | A1* | 1/2018 | Matsukawa | G03G 21/1814<br>399/100 |
| 2021/0382430 | A1* | 12/2021 | Funatani | G03G 21/0064 |
| 2022/0197175 | A1* | 6/2022 | Kobayashi | G03G 21/0064 |
| 2022/0269206 | A1* | 8/2022 | Tetsuno | G03G 21/0023 |
| 2023/0195007 | A1* | 6/2023 | Hara | G03G 21/0064 |
| 2023/0195025 | A1* | 6/2023 | Takayama | G03G 21/0082 |
| 2024/0272576 | A1* | 8/2024 | Ito | G03G 21/0035 |

FOREIGN PATENT DOCUMENTS

| | | | |
|---|---|---|---|
| JP | 2005258322 | A | 9/2005 |
| JP | 2022129271 | A | 9/2022 |

* cited by examiner

IMAGE FORMING APPARATUS

BACKGROUND

Field

The present disclosure relates to an image forming apparatus.

Description of the Related Art

Image forming apparatuses, e.g., photocopiers, laser printers, and so forth, that have a photosensitive drum and form images by an electrophotographic process have been conventionally in use. One type of cleaning system in such image forming apparatuses is a drum cleaner-less system, in which no dedicated toner cleaning means is provided to the photosensitive drum. In an image forming apparatus using the drum cleaner-less system, developing means doubles as recovery means for recovering transfer residual toner and so forth remaining on the photosensitive drum following transferring. Residual toner collected by the developing means is reused for developing. Accordingly, in the drum cleaner-less system, dedicated toner cleaning means and a container for holding the residual toner that has been collected is unnecessary, thus enabling reduced size and reduced costs of the image forming apparatus.

When a great amount of residual toner is generated on the photosensitive drum in an image forming apparatus using the drum cleaner-less system, there may be a case in which a great amount of toner adheres to a charging roller that charges the photosensitive drum. This causes defective charging, and potential difference between the surface potential of the photosensitive drum and potential of a developing member may not be able to be controlled to an appropriate value. As a result, insufficient recovery of residual toner at the developing means, and image defects due to unintended toner developing from the developing means, may occur.

Japanese Patent Application Publication No. 2022-129271 discloses technology in which toner adhering to the charging roller is charged to regular polarity, the charged toner is made to relocate from the charging roller to the photosensitive drum, and, further, is recovered from the photosensitive drum to the developing member, thereby cleaning the charging roller. Thus, defective charging of the surface of the photosensitive drum is suppressed, and image defects are suppressed.

Now, there may be a case in which a great amount of toner that is charged to regular polarity is adhering to the developing member, e.g., in a case in which the toner has deteriorated, due to being at the end of product life-expectancy, or the like. In such a case, the potential difference between the developing member and the surface of the photosensitive drum facing the developing member cannot be appropriately controlled, and accordingly, great amounts of toner continue to be discharged from the developing member to the photosensitive drum. In such a case, cleaning effects of the charging roller may be reduced in some cases.

SUMMARY

The present disclosure has been made in light of the foregoing problem, and an object thereof is to provide technology for appropriately removing toner adhering to a charging roller in an image forming apparatus using a drum cleaner-less system.

The present disclosure provides an image forming apparatus, includes an image bearing member configured to be rotatable, a charging member configured to come into contact with the image bearing member and form a charging portion, and charge a surface of the image bearing member at the charging portion, a developing member configured to be rotatable and come into contact with the image bearing member and form a developing portion, and form a toner image by developing an electrostatic latent image that is formed on the surface of the image bearing member on the basis of image information, by supplying toner charged to a regular polarity to the surface of the image bearing member at the developing portion, a transfer member configured to face the image bearing member, form a transfer portion together with the image bearing member, and transfer the toner image from the image bearing member to a recording material at the transfer portion, a charging voltage applying portion for applying charging voltage to the charging member, a developing voltage applying portion for applying developing voltage to the developing member, a transfer voltage applying portion for applying transfer voltage to the transfer member, and a control unit configured to control the charging voltage applying portion, the developing voltage applying portion, and the transfer voltage applying portion. Following the toner image, which is formed on the surface of the image bearing member at the transfer portion, being transferred to the recording material, toner remaining on the surface of the image bearing member is recovered by the developing member. The control unit is capable of carrying out an image forming operation of forming the toner image developed from the electrostatic latent image on the recording material, and a cleaning operation of cleaning the charging member. The cleaning operation includes a first cleaning operation and a second cleaning operation and is executed at a timing of executing an image non-formation operation that is different from the image forming operation. In the first cleaning operation, toner adhering to the charging member is recovered by the developing member. In the second cleaning operation, the toner adhering to the charging member is discharged to the recording material passing through the transfer portion.

According to the present disclosure, toner adhering to the charging roller can be appropriately removed in the image forming apparatus using the drum cleaner-less system.

Further features of the present disclosure will become apparent from the following description of exemplary embodiments with reference to the attached drawings.

DESCRIPTION OF THE EMBODIMENTS

Embodiments of the present disclosure will be exemplarily described below in detail with reference to the Figures. Note however, that the dimensions, materials, shapes, relative placements thereof, and so forth, of components described in the embodiments below should be changed as appropriate in accordance with the configuration of the apparatus to which the present disclosure is applied, and various conditions. Accordingly, limiting the scope of the present disclosure to these alone is not intended, unless specifically stated otherwise.

First Embodiment

1. Image Forming Apparatus

Figure 1:
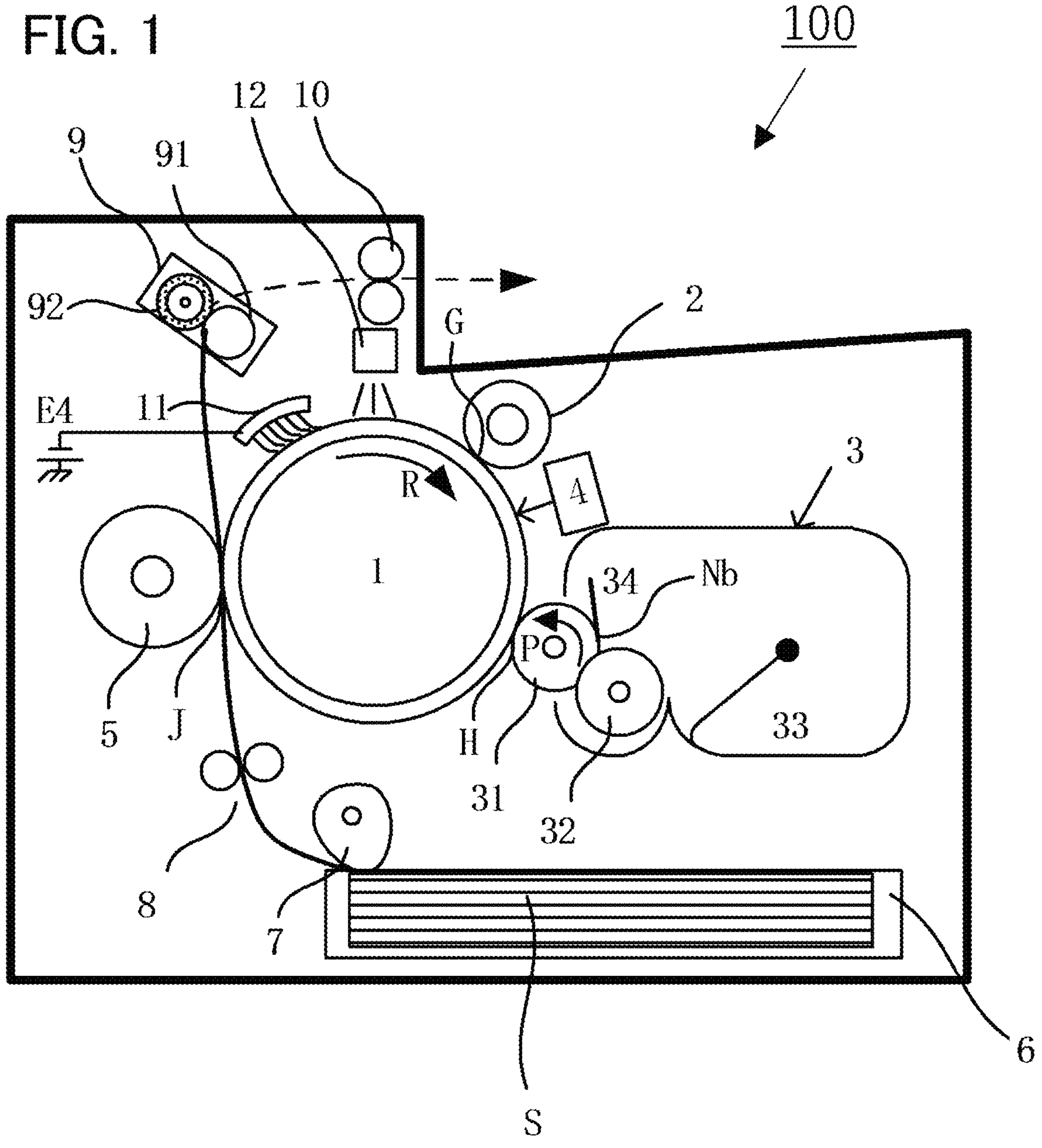
FIG. 1 is a cross-sectional view of an image forming apparatus according to a first embodiment.

FIG. 1 is a cross-sectional diagram for describing a schematic configuration of an image forming apparatus 100 according to a first embodiment. The image forming apparatus 100 according to the present embodiment is a monochrome laser beam printer that adopts a cleaner-less system and a contact charging system.

The image forming apparatus 100 is equipped with a photosensitive drum 1 (image bearing member). A charging roller 2 (charging means, charging member) and a developing apparatus 3 (developing means) are provided in the periphery of the photosensitive drum 1. Also, in FIG. 1, an exposing device 4 (exposing means, exposing unit) is provided between the charging roller 2 and the developing apparatus 3 in a rotation direction R of the photosensitive drum 1. Further, a transfer roller 5 (transfer means, transfer member) is pressed into contact with the photosensitive drum 1.

The photosensitive drum 1 according to the present embodiment is an organic photosensitive member that is cylindrically shaped and is negatively charged. The photosensitive drum 1 has a photosensitive layer upon a drum-shaped base of aluminum. The photosensitive drum 1 is rotationally drive at a predetermined process speed in the rotation direction R by a driving motor 110 (driving means) illustrated in FIG. 3. The process speed in the present embodiment is equivalent to circumferential speed (surface travel speed) of the photosensitive drum 1, which is 140 mm/sec. Also, the outer diameter of the photosensitive drum 1 is 24 mm.

The charging roller 2 comes into contact with the photosensitive drum 1 under a predetermined pressing force, thereby forming a charging portion G. The charging roller 2 applies a desired charging voltage Vc (charging bias) by a charging power source E1 (charging voltage applying portion). Thus, the charging roller 2 uniformly charges the surface of the photosensitive drum 1 to a predetermined potential. In the present embodiment, the charging power source E1 applies a direct current voltage of negative polarity to the charging roller 2, as the charging voltage Vc. Thus, the charging roller 2 charges the surface of the photosensitive drum 1 to negative polarity. The charging voltage Vc according to the present embodiment is set at −1300 V. According to this charging processing, the surface of the photosensitive drum 1 is uniformly −700 V dark potential Vd.

More specifically, the charging roller 2 charges the surface of the photosensitive drum 1 by discharge occurring in at least one of minute gaps formed between the charging roller 2 and the photosensitive drum 1 on the upstream side and the downstream side of the contact portion with the photosensitive drum 1, with respect to the rotation direction R of the photosensitive drum 1. However, the contact portion of the charging roller 2 and the photosensitive drum 1 will be hypothetically described as being the charging portion G hereinafter.

The exposing device 4 according to the present embodiment is a laser scanning device. The exposing device 4 irradiates the surface of the photosensitive drum 1 by laser light corresponding to image information that is input from an external apparatus such as a host computer or the like, and performs scanning exposure thereof. Thus, an electrostatic latent image corresponding to the image information is formed on the surface of the photosensitive drum 1. In the present embodiment, of the dark potential Vd (−700 V) on the surface of the photosensitive drum 1 formed uniformly by charging processing, the absolute value of potential drops at portions exposed by the exposing device 4, thus becoming light potential V1 (−100 V).

Hereinafter, portions of the surface of the photosensitive drum 1 that are exposed by the exposing device 4 will be referred to as exposed portions. Exposed portions are "image formation portions" where images (electrostatic latent images) are formed. Conversely, portions that are not exposed are "image non-formation portions". Note that the exposing device 4 is not limited to a laser scanning apparatus, and may be a light-emitting diode (LED) array in which a plurality of LEDs are arrayed in a longitudinal direction of the photosensitive drum 1, for example.

Contact developing is used as the developing system according to the present embodiment. The developing apparatus 3 (developing means) includes a developing roller 31 (developer bearing member, developing member), a supply roller 32 (developer supply means), a toner accommodation chamber 33 that accommodates toner (developer), and a developing blade 34.

The supply roller 32 supplies toner from the toner accommodation chamber 33 to the developing roller 31. The supplied toner passes a blade nip Nb that is a contact portion of the developing roller 31 and the developing blade 34, and in doing so, is charged to a predetermined polarity. The toner borne on the developing roller 31 travels from the developing roller 31 to the photosensitive drum 1, in accordance with the electrostatic latent image. A contact portion of the developing roller 31 and the photosensitive drum 1 is a developing portion H here.

The developing roller 31 according to the present embodiment is rotationally driven in a rotation direction P. Accordingly, the photosensitive drum 1 and the developing roller 31 travel in a forward direction at the contact portion of the photosensitive drum 1 and the developing roller 31. Note that for driving means of the developing roller 31, the driving motor 110 may be used in common with the photosensitive drum 1. Alternatively, separate driving motors may drive the photosensitive drum 1 and the developing roller 31.

When developing, a predetermined developing voltage Vf (developing bias) is applied to the developing roller 31 from a developing power source E2 (developing voltage applying portion). In the present embodiment, the developing power source E2 applies a direct current voltage of a negative polarity to the developing roller 31 as the developing voltage Vf, the value thereof being −380 V. As described above, the absolute value of potential has dropped at the image formation portion on the photosensitive drum 1 (from −700 V to −100 V) due to the exposure. The toner that is charged to the same polarity as the charging polarity of the photosensitive drum 1 (negative polarity in the present embodiment) adheres to this image formation portion. This developing system is referred to as an inverse developing system. In the present embodiment, the regular polarity, which is the charging polarity of toner when developing, is negative polarity.

Note that while single-component non-magnetic contact developing is adopted in the present embodiment, the present embodiment is not limited to this form, and two-component non-magnetic contact developing, non-contact developing, magnetic developing, and so forth, may be adopted. Two-component non-magnetic contact developing is a method in which a two-component developer containing non-magnetic toner and magnetic carrier is used as the developer, and developing is performed by bringing developer borne on a developer bearing member into contact with the photosensitive drum 1. Non-contact developing is a method in which developing is performed by causing toner to fly from a developer bearing member, which is disposed contactlessly facing a photosensitive member, onto the photosensitive member. Also, magnetic developing is a method in which developing is performed by bearing magnetic toner on a developer bearing member that has a magnet serving as magnetic field generating means built in, by magnetic force, and that is disposed facing a photosensitive member, either in contact or contactlessly. Note that in the present embodiment, toner is used that has a median average particle diameter of 6 μm, and of which the regular charging polarity is negative polarity.

The transfer roller 5 is suitably configured as an elastic member such as sponge rubber or the like, made of polyurethane rubber, ethylene propylene diene monomer (EPDM) rubber, nitrile butadiene rubber (NBR), or the like. The transfer roller 5 is pressed toward the photosensitive drum 1, and forms a transfer portion J at which the photosensitive drum 1 and the transfer roller 5 are pressed into contact.

When transferring, a predetermined transfer voltage Vt (transfer bias) is applied to the transfer roller 5 from a transfer power source E3 (transfer voltage applying portion). In the present embodiment, the transfer power source E3 applies direct current voltage of opposite polarity (positive polarity in the present embodiment) from the regular polarity of the toner as transfer voltage Vt to the transfer roller 5, and the value thereof is +1000 V. A toner image is then electrostatically transferred from the photosensitive drum 1 to a transfer material S, due to effects of an electric field formed between the transfer roller 5 and the photosensitive drum 1.

In accordance with the timing of the toner image formed on the photosensitive drum 1 reaching the transfer portion J, the transfer material S serving as a recording material stored in a cassette 6 is fed out by a sheet feed unit 7, passes between a register roller pair 8, and is transported to the transfer portion J. The toner image formed on the photosensitive drum 1 is transferred onto the transfer material S by the transfer roller 5 to which the predetermined transfer voltage Vt is applied by a transfer high-voltage power source.

The transfer material S following transfer of the toner image is transported to a fixing unit 9. The fixing unit 9 is a film-heating type fixing unit that includes a fixing film 91 in which is built in a fixing heater that is omitted from illustration and a thermistor, which is omitted from illustration, for measuring the temperature of the fixing heater, and a pressure roller 92 for pressing against the fixing film 91. The heating and the pressure in the fixing unit 9 fix the toner image onto the transfer material S. Thereafter, a discharge roller pair 10 discharges the transfer material S to outside of the apparatus.

Now, toner that is not used in image formation, such as transfer residual toner or the like remaining on the photosensitive drum 1 without being transferred onto the transfer material S, is removed by the following steps.

The transfer residual toner remaining on the photosensitive drum 1 contains therein toner charged to positive polarity that is opposite to the regular polarity, and toner that is charged to negative polarity but does not have a sufficient charge, in an intermingled manner. These toners are charged to a sufficient negative polarity by discharge from a potential difference formed between the charging roller 2 and the photosensitive drum 1, at a position just short of the charging portion G, which is the contact portion of the charging roller 2 and the photosensitive drum 1. As a result, the toner passes through the charging portion without any toner adhering to the charging roller 2, due to gaining electrostatic repulsive force with respect to the charging roller 2 to which is applied the charging voltage Vc of negative polarity.

Note that part of the toner that is not sufficiently charge to negative polarity by the discharge at the charging portion G adheres onto the charging roller 2. However, the toner adhered to the charging roller 2 is charged to negative polarity again by rubbing that occurs between the charging roller 2 and the photosensitive drum 1, and by application of the charging voltage Vc. The adhering toner then relocates from the charging roller 2 onto the photosensitive drum 1, due to the electrostatic repulsive force as to the charging roller 2 to which the charging voltage Vc of negative polarity is applied.

The residual toner on the photosensitive drum 1 that is charged to negative polarity at the charging roller 2 reaches the developing portion H in conjunction with rotation of the photosensitive drum 1, and thereafter is processed as follows.

Figure 4:
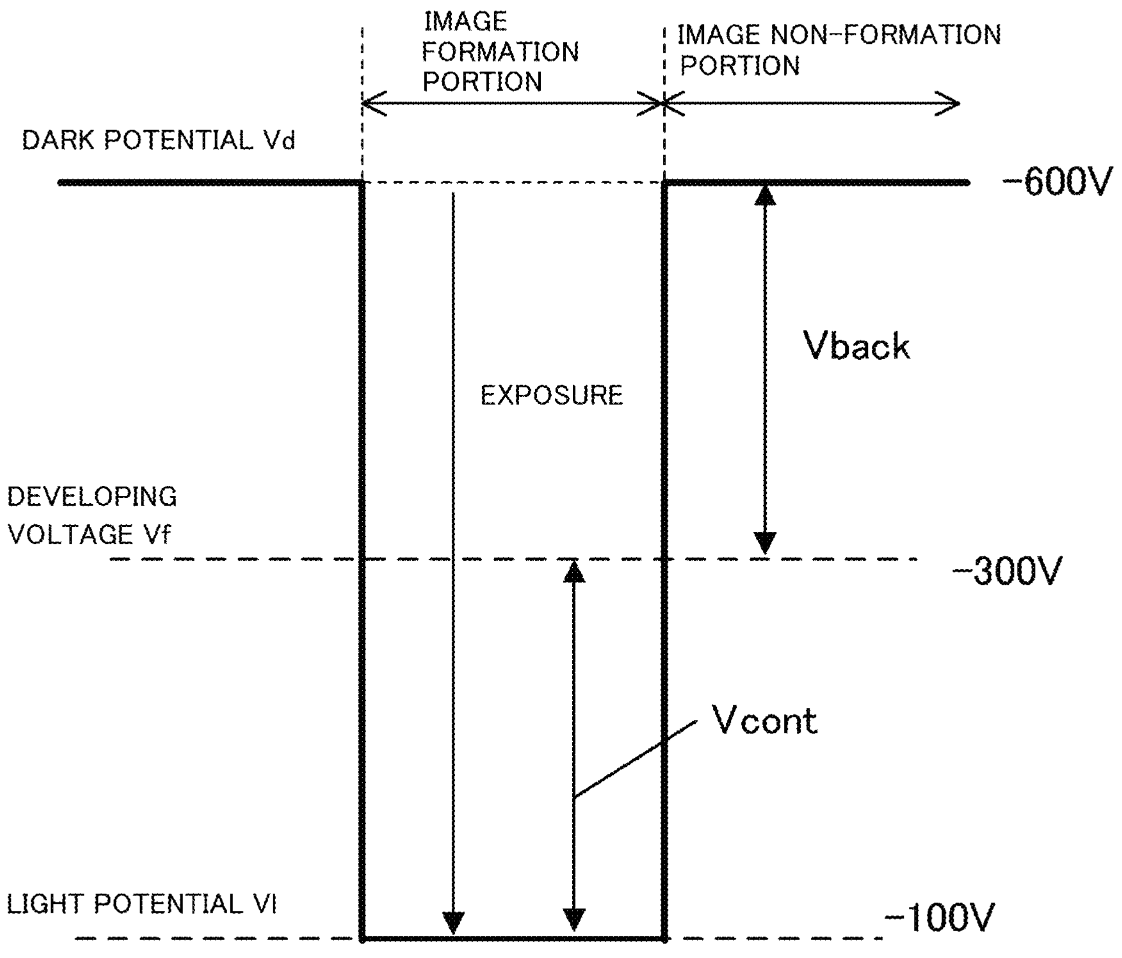
FIG. 4 is a diagram for describing relation among potentials at a developing portion according to the first embodiment.

FIG. 4 shows a relation in the first embodiment between surface potential (dark potential Vd, light potential V1) formed on the photosensitive drum 1 at the developing portion H, and the developing voltage Vf. The horizontal axis schematically indicates the position on the surface of the photosensitive drum 1, and the vertical axis indicates potential. In the image non-formation portion where no electrostatic latent image is formed, the developing voltage Vf is a value relatively closer to the positive polarity side as compared to the surface potential of the photosensitive drum 1 (dark potential Vd). According to such a relation among potentials, the residual toner that is charged to negative polarity on the photosensitive drum 1 relocates from the photosensitive drum 1 to upon the developing roller 31, and thereafter is recovered to the toner accommodation chamber 33. Note that the toner recovered to the toner accommodation chamber 33 is used for image formation again.

Now, preferable settings of a back contrast (Vback) value, which is an absolute value of potential difference between the surface potential (dark potential Vd) of the photosensitive drum 1 in the image non-formation portion shown in FIG. 4, and the developing voltage (Vf), will be described.

A sufficient Vback is preferably secured at the developing portion H, in order to recover the toner charged to negative polarity on the photosensitive drum 1 at the developing roller 31. Vback is preferably set to a value where a phenomenon, in which toner borne on the developing roller 31 is unintentionally developed on the surface of the photosensitive drum 1 (i.e., occurrence of "fogging toner", which will be described later), can be suppressed. Specifically, Vback is preferably set to around 100 V to 500 V.

Note that in a case in which Vback is lower than 100 V, there is a possibility that sufficient recovery of toner charged to negative polarity, which is adhering to the surface of the photosensitive drum 1, cannot be secured. Further, the phenomenon in which toner charged to negative polarity on the developing roller 31 is unintentionally developed on the photosensitive drum 1 (fogging toner) occurs more readily. Conversely, in a case in which Vback is greater than 500 V, there is a possibility that toner on the developing roller 31 will be charged to the positive polarity side due to discharging occurring between the developing roller 31 and the photosensitive drum 1. As a result, the toner relocates from upon the developing roller 31 to upon the photosensitive drum 1, and fogging toner readily occurs. Accordingly, in the first embodiment, the dark potential Vd of the photosensitive drum 1 is set to −600 V, the developing voltage Vf to −300 V, and Vback to 300 V.

Also, as shown in FIG. 4, the image formation portion where the electrostatic latent image is formed at the developing portion H is at light potential V1. The relation between the light potential V1 and the developing voltage Vf is such that toner charged to negative polarity is supplied from upon the developing roller 31 to upon the photosensitive drum 1, for developing. This relation among potentials is referred to as developing contrast (Vcont). Accordingly, the toner charged to negative polarity upon the photosensitive drum 1 is used without change as the toner image, and also the electrostatic latent image is developed as a toner image by toner being supplied from the developing roller 31. The toner image that is formed is then transferred to the transfer material S at the transfer portion J.

Also, as illustrated in FIG. 1, a pre-exposing device 12 (static eliminating means) that performs static elimination of charged potential on the photosensitive drum 1 is provided between the transfer portion J and the charging portion G, in the rotation direction R of the photosensitive drum 1. Performing static elimination using the pre-exposing device 12 enables variance in surface potential of the photosensitive drum 1 occurring due to transferring to be evened out, and accordingly discharge at the charging portion G is stabilized, and a uniform charging potential can be obtained.

Note that the photosensitive drum 1, the charging roller 2, and so forth, may be integrated in a casing, so as to form a cartridge that is detachably attachable to a main body of the image forming apparatus 100. Also, the developing apparatus 3 may be made into a cartridge that is detachably attachable to the main body of the image forming apparatus 100. Further, a cartridge including the photosensitive drum 1, the charging roller 2, and the developing apparatus 3 may be made that is detachably attachable to the main body of the image forming apparatus 100. Note that the image forming apparatus 100 is not limited to a monochrome system, and may be a color printing system that uses a plurality of colors (e.g., four colors).

Next, a paper dust removal mechanism according to the present embodiment will be described. As illustrated in FIG. 1, the image forming apparatus 100 has a brush member 11 (recovery member). The brush member 11 is the paper dust removal mechanism, and is a contact member that comes into contact with the photosensitive drum 1. The brush member 11 according to the present embodiment is disposed on the downstream side from the transfer portion J and also on the upstream side from the charging portion G, with respect to the rotation direction R of the photosensitive drum 1. The brush member 11 comes into contact with the surface of the photosensitive drum 1 and forms a brush contact portion.

Figure 2A:
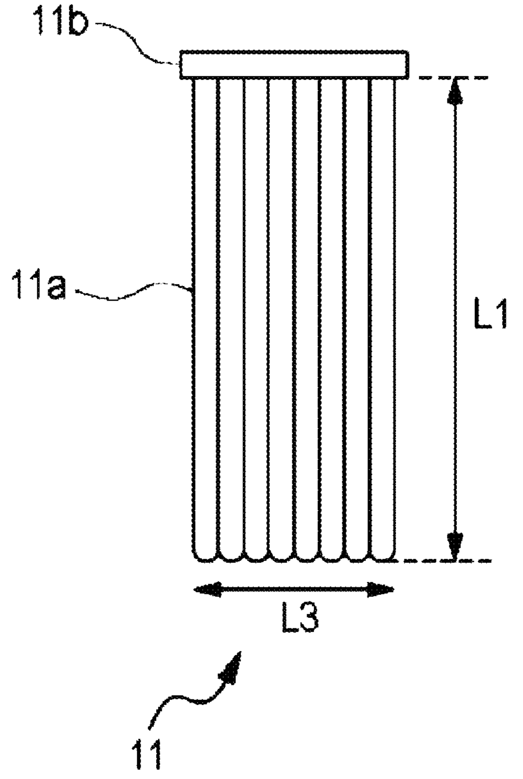
FIGS. 2A and 2B are schematic views of a brush member according to the first embodiment.
Figure 2B:
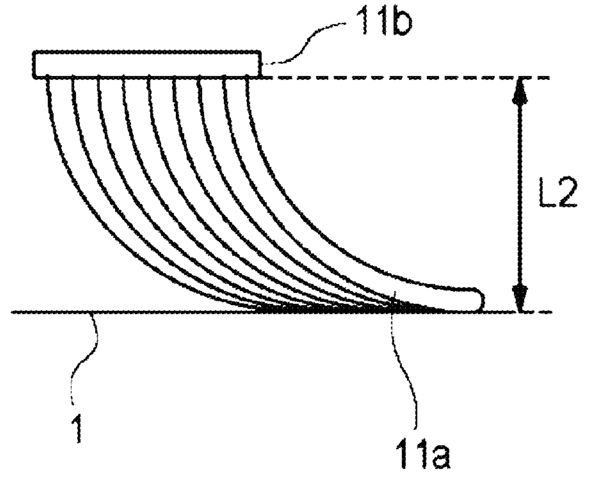

FIG. 2A is a schematic view of the brush member 11 alone, as viewed along a longitudinal direction thereof (substantially parallel with a rotation axial line direction of the photosensitive drum 1). Also, FIG. 2B is a schematic diagram of the brush member 11 in a state in contact with the photosensitive drum 1, as viewed along the longitudinal direction thereof. The brush member 11 is disposed such that the longitudinal direction thereof is substantially parallel with the rotation axial line direction of the photosensitive drum 1.

The brush member 11 is made up of an electroconductive fixed brush that is fixedly disposed. The brush member 11 is made up of pile yarn 11*a* made of nylon that is electroconductive, and a base fabric 11*b* that supports the pile yarn 11*a*. The pile yarn 11*a* is a plurality of bristles that rub the surface of the photosensitive drum 1. An example of the brush member 11 may be used is an arrangement in which the pile yarn 11*a* (electroconductive yarn) that is formed of nylon fibers containing an electroconductive substance and that is electroconductive, is woven into the base fabric 11*b* formed of a synthetic fiber containing carbon as a conducting agent. Also, rayon, acrylic, polyester, and so forth, may be used as materials of the pile yarn 11*a*, besides nylon.

In a state in which the brush member 11 is alone, i.e., in a state in which no external force to flex the pile yarn 11*a* is applied, as illustrated in FIG. 2A, L1 is a length from the base fabric 11*b* to a distal end of the pile yarn 11*a* that is exposed. In the present embodiment, L1 is 6.5 mm. The base fabric 11*b* of the brush member 11 is fixed by fixing means such as double-sided tape to a supporting member (omitted from illustration) installed at a predetermined position of the image forming apparatus 100.

The brush member 11 is fixed such that the distal end of the pile yarn 11*a* penetrates the photosensitive drum 1. The term "penetrate" as used here indicates a state in which the distal end of the pile yarn 11*a* is flexed due to contact with the photosensitive drum 1, and is shorter than the natural length thereof, as illustrated in FIG. 2B. In the present embodiment, the clearance between the supporting member and the photosensitive drum 1 is fixed. L2 is a shortest distance from the base fabric 11*b* of the brush member 11 that is fixed to the aforementioned supporting member to the photosensitive drum 1. In the present embodiment, the difference between L2 and L1 is defined as being a penetration level of the brush member 11 with respect to the photosensitive drum 1. In the present embodiment, the penetration level of the brush member 11 as to the photosensitive drum 1 is 1 mm.

Also, in the present embodiment, a length L3 of the brush member 11 in the state in FIG. 2A with respect to a peripheral direction of the photosensitive drum 1 (hereinafter, referred to as "lateral direction") is 5 mm. Also, in the present embodiment, the length of the brush member 11 in the longitudinal direction is 216 mm. Accordingly, the brush member 11 is capable of coming into contact with the entire region of an image formation region (region in which toner images can be formed) on the photosensitive drum 1, with respect to the rotation axial line direction of the photosensitive drum 1. Due to this configuration, the brush member 11 can rub the surface of the photosensitive drum 1 in conjunction with rotation of the photosensitive drum 1. The brush member 11 collects (recovers) adhering substances such as paper dust or the like that have become relocated from the transfer material S onto the photosensitive drum 1 at the transfer portion, thereby reducing the amount of paper dust that travels to the charging portion G and to the developing portion H on the downstream side from the brush member 11 with respect to the direction of travel of the photosensitive drum 1.

Note that the length of the brush member 11 in the lateral direction of the photosensitive drum 1 is not limited to the example above, and may be changed as appropriate in accordance with the life expectancy of the image forming apparatus 100, the photosensitive drum 1, and so forth. The longer the brush member 11 is in the lateral direction, the longer the time that paper dust can be collected is. Also, the length of the brush member 11 in the longitudinal direction is not limited to the above example, and may be changed as appropriate in accordance with the largest sheet passage width of the image forming apparatus.

A brush power source E4 serving as brush voltage applying means is connected to the brush member 11. Predetermined brush voltage (brush bias) is applied to the brush member 11 by the brush power source E4 when forming images. In the present embodiment, when forming images, direct current voltage of negative polarity is applied to the brush member 11 as brush voltage. The brush voltage according to the present embodiment is −350 V.

2. Control Form

Figure 3:
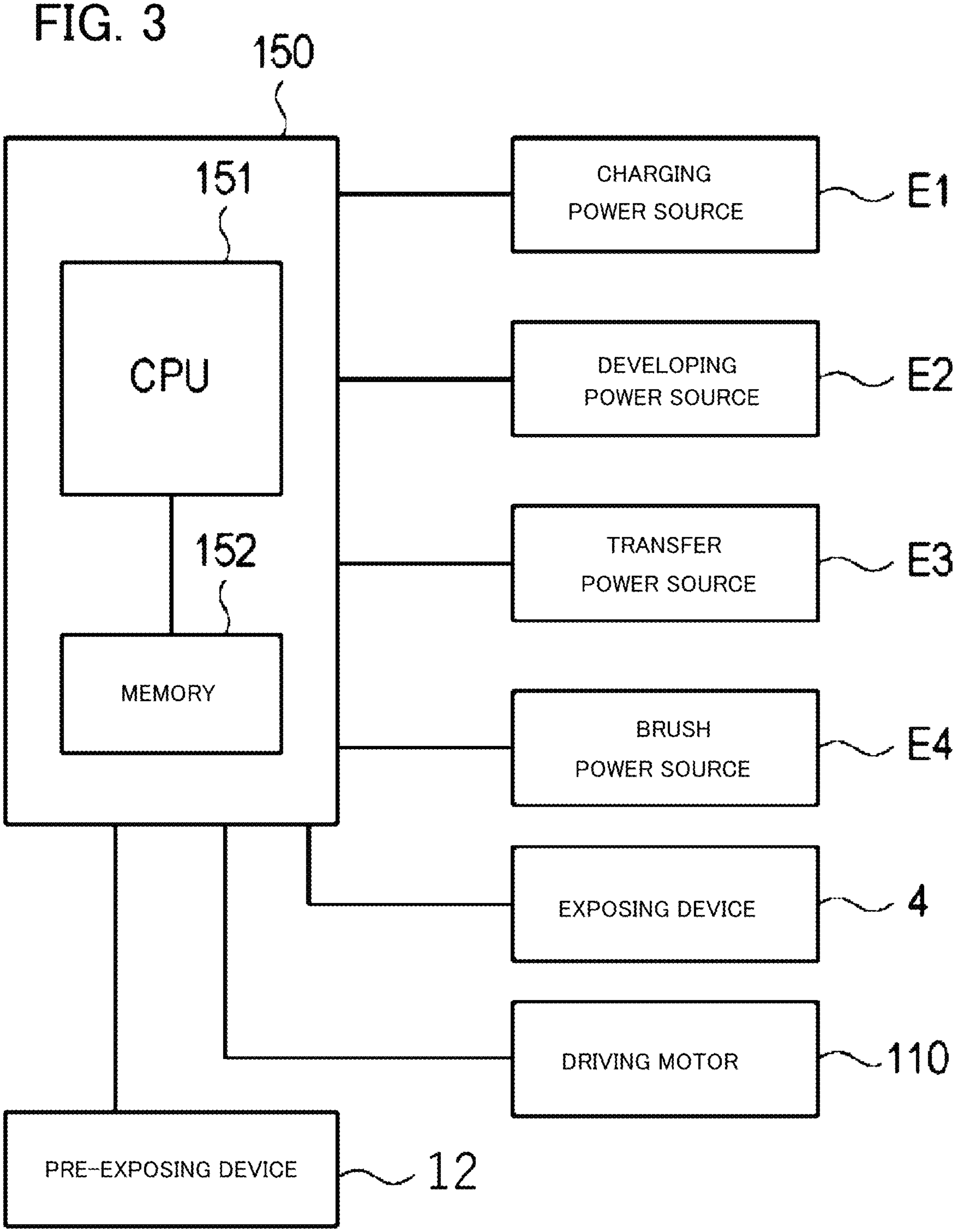
FIG. 3 is a control block diagram according to the first embodiment.

FIG. 3 is a schematic block diagram illustrating a control form of principal portions of the image forming apparatus 100 according to the present embodiment. A control unit 150 has a central processing unit (CPU) 151 (computing control means), and memory 152 such as read-only memory (ROM), random access memory (RAM), and so forth (storage means, storage device) and receives signals from each of the components connected to the control unit 150 and also transmits control signals. In the memory 152, sensing results of sensors, computation results, and so forth are stored in the RAM, while control programs, data tables found in advance, and so forth are stored in the ROM. The control unit 150 is control means that centrally controls operations of the image forming apparatus 100. The control unit 150 executes a predetermined image formation sequence by controlling exchange of various types of electrical information signals, timing for driving, and so forth. Each part of the image forming apparatus 100 is connected to the control unit 150.

3. Image Output Operations

An image output operation (job) is a series of operations for the image forming apparatus 100 to form images on the transfer material S, under instructions from external equipment such as a personal computer or the like, and from users. Generally, the image output operation has an image forming step (printing step), a forward rotation step, an inter-sheet step in a case of forming images on a plurality of transfer materials S, and a reverse rotation step.

The image forming step is a period of performing forming of an electrostatic latent image on the photosensitive drum 1, developing of the electrostatic latent image (forming of a toner image), transferring of the toner image, fixing of the toner image, and so forth, and the term "when forming images" generally refers to this step. The forward rotation step is a period of performing preparatory operations prior to the image forming step. The inter-sheet step is a period corresponding to between a transfer material S and a transfer material S when consecutively performing the image forming step with regard to the plurality of transfer materials S (when performing consecutive image forming). The reverse rotation step is a period of performing organizing operations (preparatory operations) following the image forming step. The term "when not forming images" is a period other than when forming images, and includes the above forward rotation step, inter-sheet step, reverse rotation step, and further includes a forward multi-rotation step that is preparatory operations when turning on the power source of the image forming apparatus 100 or when returning from a sleep state, and so forth.

4. Cleaning Operations of Charging Member

In a case in which there is a great amount of residual toner on the photosensitive drum 1 following transfer, processing for making the residual toner on the photosensitive drum 1 to have negative polarity at the charging portion G may be insufficient. In this case, toner that is charged to positive polarity adheres to the charging roller 2, and toner soiling accumulates on the charging roller 2.

In particular, a great amount of residual toner remains on the photosensitive drum 1 following transfer when printing under a high-temperature high-humidity environment, when printing on sheets containing a great amount of talc as filler (talc paper), when jamming occurs, and so forth. In such cases, toner soiling due to toner of which charging properties have deteriorated may occur in great amounts, and toner soiling may accumulate on the charging roller 2.

Figure 5:
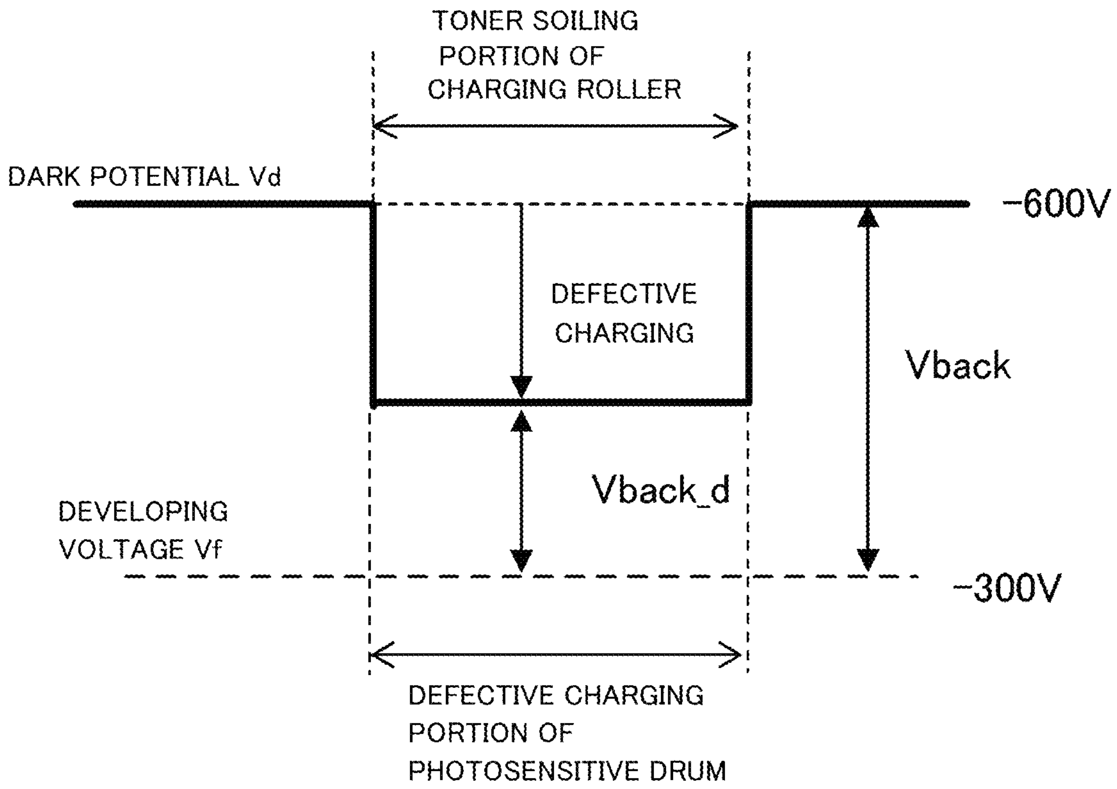
FIG. 5 is a diagram for describing defective charging due to toner soiling of a charging roller according to the first embodiment.

FIG. 5 shows a relation between surface potential of the photosensitive drum 1 and developing voltage Vf in a case in which a great amount of toner soiling has accumulated on the charging roller 2. As shown in FIG. 5, defective charging occurs in a region of the photosensitive drum 1 corresponding to a toner-soiled portion of the charging roller 2, forming a defective charging portion. In this defective charging portion, Vback decreases (Vback_d). This is because resistance increases due to toner adhering to the surface of the charging roller 2, and desired discharge cannot be performed.

In particular, when Vback becomes smaller than 100 V, insufficient recovery by the developing roller 31 regarding residual toner charged to negative polarity on the photosensitive drum 1 occurs in the image non-formation portion, as described earlier. Further, there is concern of fogging toner occurring on the photosensitive drum 1. The residual toner on the photosensitive drum 1 that remains unrecovered, and the fogging toner adhere to the charging roller 2 as toner soiling, further exacerbating the defective charging. As the discharge amount at the charging portion G decreases due to the toner soiling on the charging roller 2, the absolute value of surface potential on the photosensitive drum 1 becomes smaller. Moreover, the further the reduction in discharge amount advances, the smaller Vback becomes, and accordingly the amount of fogging toner increases.

Figure 6:
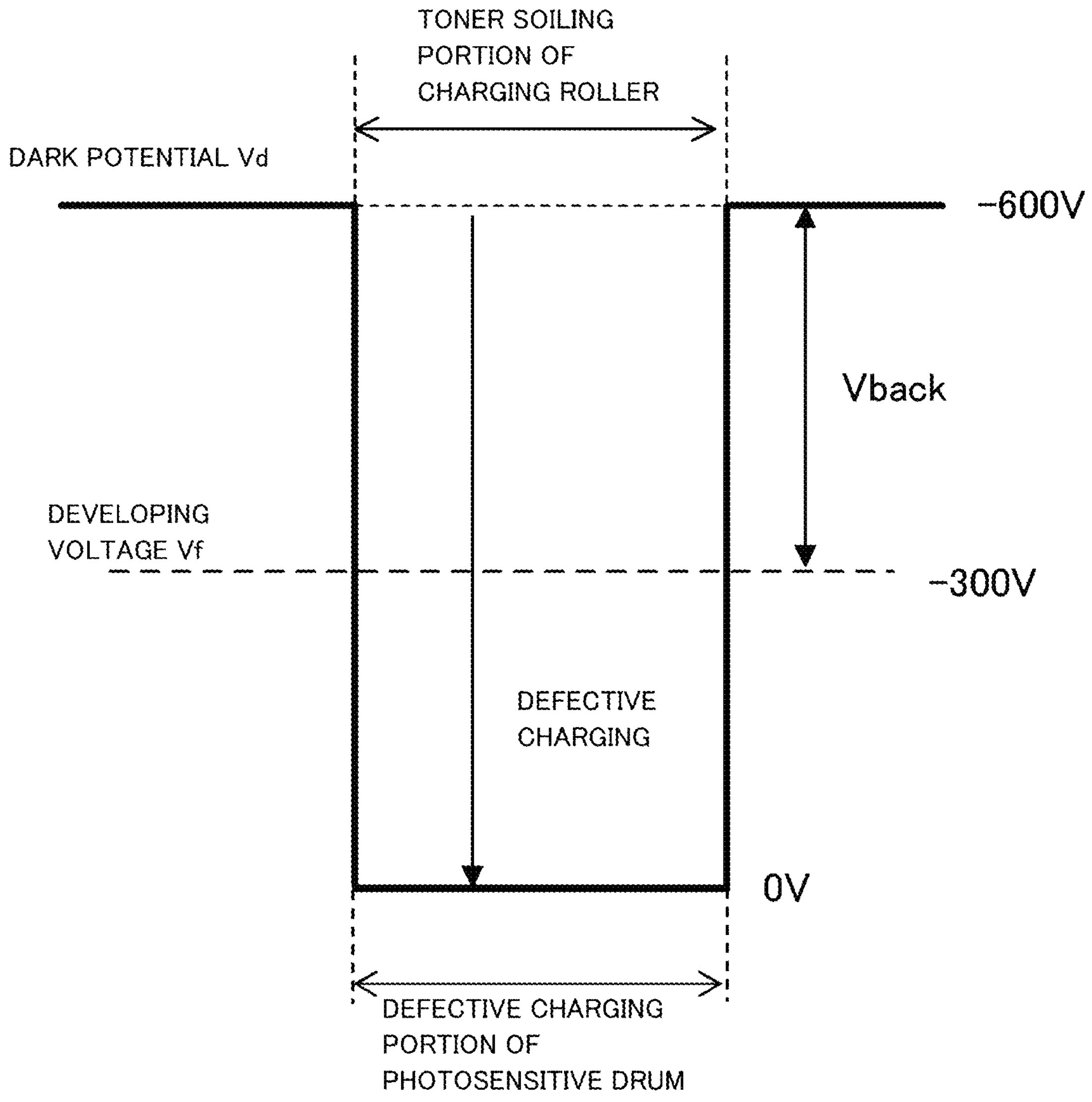
FIG. 6 is a diagram for describing defective charging due to toner soiling of the charging roller according to the first embodiment.

FIG. 6 shows surface potential of the photosensitive drum 1 in a case in which toner soiling is allowed to advance, as described above. When the toner soiling advances to the state shown in FIG. 6, charging of the photosensitive drum 1 at the defective charging portion corresponding to the toner soiling portion of the charging roller 2 essentially cannot be performed any longer. Also, part of the toner developed at the defective charging portion on the photosensitive drum 1, due to the toner soiling of the charging roller 2, is transferred onto the transfer material S, resulting in image defects due to toner soiling.

Such image defects are resolved by a cleaning operation of the charging roller 2 described in the related art (first cleaning operation, hereinafter referred to as "cleaning operation 1"). To summarize the cleaning operation 1, the photosensitive drum 1, the charging roller 2, and the developing roller 31 are rotated with the charging voltage Vc at negative polarity and also no higher than discharge starting voltage, and with developing voltage Vf of positive polarity (opposite polarity from regular polarity). The above operation causes the toner with positive polarity adhering to the charging roller 2 to be made to have negative polarity, and to travel to the photosensitive drum 1 and be recovered to the toner accommodation chamber 33 via the developing roller 31. Note that the first cleaning operation and a second cleaning operation that will be described later, are executed at timings of image non-forming operations that are different timings from image forming operations.

Now, there are cases in which a phenomenon called developing filming (or simply "filming") occurs in which a great amount of toner that is charged to regular polarity adheres to the developing roller 31, such as cases in which the toner has deteriorated, due to being at the end of product life expectancy, or the like.

Developing filming will be described in detail. In a case in which the toner has not deteriorated, following the toner being supplied to the developing roller 31 at the downstream portion of the contact portion of the supply roller 32 and the developing roller 31, either when forming images or when not forming images, the toner on the developing roller 31 is regulated by the developing blade 34. Thus, excess toner is removed from upon the developing roller 31. Accordingly, a constant amount of toner is always maintained when the developing roller 31 comes into contact with the photosensitive drum 1. The toner on the developing roller 31 after contact with the photosensitive drum 1 is removed from the developing roller 31 at the upstream portion of the contact portion of the supply roller 32 and the developing roller 31.

Conversely, in a case in which the toner has deteriorated, part of toner supplied to the developing roller 31 at the downstream portion of the contact portion of the supply roller 32 and the developing roller 31 becomes strongly fixed to the developing roller 31. There are cases in which this fixed toner cannot all be removed even by regulation by the developing blade 34. Further, there are cases in which the fixed toner cannot all be removed even at the upstream portion of the contact portion of the supply roller 32 and the developing roller 31 after coming into contact with the photosensitive drum 1. Deteriorated toner that further becomes adhered over this gradually becomes fixed. Such repetitive fixing of toner, leading to the phenomenon of a great amount of toner becoming fixed on the developing roller 31, is developing filming.

When developing filming occurs, a toner that is charged to the regular polarity (negative polarity) adheres to the developing roller 31 in great amounts, the potential of the developing roller 31 at the outermost surface portion thereof shifts toward the regular polarity side from the potential of the developing voltage Vf applied to the developing roller 31. This is due to toner of regular polarity adhering to the surface of the developing roller 31, causing the surface of the developing roller 31 to have a potential that is closer to the negative polarity side than a core portion of the developing roller 31. Accordingly, sufficient back contrast Vback of the photosensitive drum 1 and the developing roller 31 cannot be secured at the image non-formation portions. As a result, a great amount of toner adheres to the photosensitive drum 1 even in the image non-formation portions.

When sheet passage is performed in this state, part of the great amount of adhering toner is transferred to the transfer material S, generating an image defect like a solid black image. Also, toner that has passed through the transfer portion J unchecked when sheet passage is not performed, and part of the toner not transferred to the sheet at the time of sheet passage, adheres to the charging roller 2 and causes defective charging. The toner that does not adhere to the charging roller 2 reaches the developing portion H again. However, sufficient Vback cannot be secured, as described above, and accordingly this toner is not aggressively recovered at the developing portion H. As a result, great amounts of toner continue to accumulate on the photosensitive drum 1 and the developing roller 31 at portions where developing filming is occurring.

When developing filming occurs in this way, even carrying out the cleaning operation 1 results in insufficient cleaning effects of the charging roller 2, and there are cases in which defective charging and resultant image defects cannot be suppressed, due to the following phenomena (1) to (3). First, as (1), there is a phenomenon in which toner discharged onto the photosensitive drum 1 from the developing roller 31 adheres to the charging roller 2. Next, as (2), there is a phenomenon in which the presence of toner discharged onto the photosensitive drum 1 from the developing roller 31 on the photosensitive drum 1 facing the charging roller 2 reduces frictional force between the charging roller 2 and the photosensitive drum 1, thereby impairing charging of the toner to the regular polarity, and the toner does not readily relocate from the charging roller 2 to the photosensitive drum 1. Further, as (3), there is a phenomenon in which even toner that has relocated from the charging roller 2 to the photosensitive drum 1 remains on the photosensitive drum 1 without being recovered by the developing roller 31, due to the potential difference of the developing roller 31 and the photosensitive drum 1 that faces the developing roller 31 not being suitably controlled.

Accordingly, in the present embodiment, a cleaning operation of the charging roller 2 (second cleaning operation, hereinafter referred to as "cleaning operation 2"), which will be described below is performed, whereby, even when a great amount of toner charged to the regular polarity is adhered to the developing roller 31, the toner adhering to the charging roller 2 is suitably removed and defective charging of the surface of the photosensitive drum 1 is suppressed, thereby reducing image defects.

Figure 7:
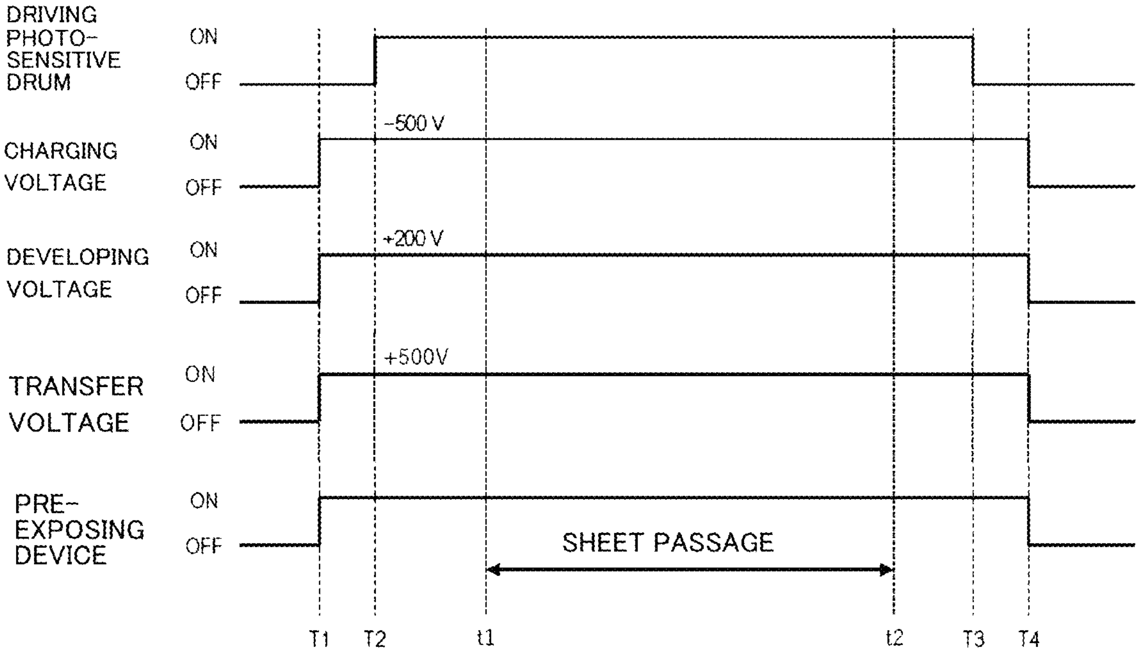
FIG. 7 is a diagram for describing cleaning operations of the charging roller according to the first embodiment.

FIG. 7 is a timing chart describing the cleaning operation 2 for toner soiling of the charging roller 2 when developing filming is occurring, according to the first embodiment. Now, the trigger for executing the cleaning operation 2 may be selection of a mode by a user, or may be a case of sensing a usage state in which occurrence of the above developing filming is expected. Examples of sensing timing include a timing of receiving an instruction from a user who has seen an image that is formed, a timing of sensing by a sensor, and so forth. Also, this may be performed when running time of the apparatus, number of prints passed, or the like, reaches a predetermined count.

At timing T1 in FIG. 7, the charging power source E1 applies charging voltage Vc to the charging roller 2, the developing power source E2 applies developing voltage Vf to the developing roller 31, and the transfer power source E3 applies transfer voltage Vt to the transfer roller 5. Also, the control unit 150 turns the pre-exposing device 12 on. In the present embodiment, the charging voltage Vc is set to −500 V, the developing voltage Vf to +200 V, and the transfer voltage Vt to +500 V. The charging voltage Vc is a voltage no higher than the discharge start voltage. In the present embodiment, the discharge start voltage is −550 V.

After the charging voltage Vc, the developing voltage Vf, and the transfer voltage Vt have sufficiently risen, the control unit 150 starts driving of the photosensitive drum 1 at timing T2. Subsequently, in a period from t1 to t2 (sheet-passage period), a sheet passes through the transfer portion J. At timing T3 after passage of the sheet, first, driving of the photosensitive drum 1 is turned off. Subsequently, at timing T4, the charging voltage Vc, the developing voltage Vf, the transfer voltage Vt, and exposing by the pre-exposing device 12, are turned off substantially simultaneously. During a period from timing T1 to T4, the developing roller 31 and the charging roller 2 are in a state of being in contact with the photosensitive drum 1. Also, timings T3 and T4 may be simultaneous.

Note that, as an example of control of transfer voltage Vt, it is possible to set transfer voltage Vt to voltage of negative polarity until sheet passage starts, and to voltage of positive polarity as described above after starting sheet passage. This is to keep negatively charged toner, out of the toner transported from the developing roller 31, from relocating to the transfer roller 5, and to allow positively charged toner to relocate to the transfer roller 5, until sheet passage starts. Transfer voltage Vt is then controlled to positive polarity after starting sheet passage, thereby transferring both the negatively charged toner on the photosensitive drum 1 and the positively charged toner on the transfer roller 5 onto the transfer material S.

In a case in which developing filming is occurring, a great amount of toner charged to negative polarity, which is regular polarity, is adhered to the surface of the developing roller 31, and accordingly even setting developing voltage Vf to positive polarity cannot provide sufficient potential difference as to the photosensitive drum 1. As a result, a great amount of toner charged to negative polarity continues to be discharged onto the photosensitive drum 1, and part of this toner adheres to the charging roller 2. In this state, applying voltage of positive polarity to the transfer roller 5 and performing sheet passage enables the toner of negative polarity on the photosensitive drum 1 to be recovered to the sheet. The surface of the photosensitive drum 1 from which toner has been removed then reaches the charging portion G, whereby toner adhesion to the charging roller 2 can be suppressed.

Also, rubbing of the surface of the photosensitive drum 1 from which toner has been removed and the charging roller 2 can charge toner of positive polarity adhering to the charging roller 2, and toner without a sufficient charge of negative polarity, to negative polarity. The toner can then be relocated from the charging roller 2 onto the photosensitive drum 1 by electrostatic repulsive force of the negative polarity toner and the charging roller 2.

Further, toner that is charge to negative polarity, which has been relocated from on the charging roller 2 to the photosensitive drum 1, can be relocated to sheets at the transfer portion J to which transfer voltage Vt of the positive polarity side has been applied via the sheet, and thus can be discharged to the outside of the apparatus. Hence, toner adhering onto the charging roller 2 can be removed.

Note that, in the present embodiment, the charging voltage Vc, the developing voltage Vf, and the transfer voltage Vt uniformly rise at the same timing. Also, the pre-exposing device 12 is turned on. However, while there is a need for the charging voltage Vc and the developing voltage Vf to rise before driving the driving motor 110, it is sufficient for the transfer voltage Vt to go to on by the time that the sheet reaches the transfer portion. Also, the pre-exposing device 12 may start exposition at the timing of the surface of the photosensitive drum 1, on which the developing portion H was formed in a state of driving of the photosensitive drum 1 being stopped, reaches a position of a face facing the pre-exposing device 12, i.e., reaches a pre-exposure portion at which the surface of the photosensitive drum 1 is exposed. Also, exposure may be started at the timing of the surface of the photosensitive drum 1, on which the charging portion G was formed reaches the pre-exposure portion at which the surface of the photosensitive drum 1 is exposed. Note that turning the pre-exposing device 12 on is performed giving consideration to the possibility that photosensitive drum potential will be charged from 0 V to the negative polarity side by injection charge via the toner, due to application of −500 V charging voltage.

Now, a transporting direction length of the sheet (transfer material S) passing through the transfer portion J in the cleaning operation 2 will be explained. First, in order to remove toner on the surface of the photosensitive drum 1, the length of the sheet needs to be at least a length of one time around the photosensitive drum 1. Further, in addition to this length, a length in the transporting direction of the photosensitive drum 1 facing the charging roller 2 while the charging roller 2 makes one cycle may be provided, taking into consideration the relocation of toner from the charging roller 2 to the photosensitive drum 1.

Relocation of the toner discharged onto the photosensitive drum 1 due to developing filming, to the transfer material S, starts at the time of the transfer material S beginning to pass through the transfer portion J (i.e., t1). The reason is that after the surface of the photosensitive drum 1 forming the transfer portion J at the point in time of t1 reaching the charging portion G, the charging roller 2 and the surface of the photosensitive drum 1 from which the toner is removed are rubbed for one cycle of the charging roller 2, and it is desirable for the transfer material S to remain at the transfer portion J until the surface of the photosensitive drum 1 that is rubbed to form the transfer portion with the transfer material S again. Of course, the transporting direction length of the transfer material S may be made to be longer than this, and a plurality of sheets may be passed consecutively.

The longitudinal-direction length of the transfer material S passing through the transfer portion J is preferably at least a length that covers a portion equivalent to a longitudinal position at which developing filming is occurring, or longer. As one example, in a case in which the length of a developing opening at which toner is supplied in the longitudinal direction of the developing roller 31 is 221.6 mm, the length of the transfer material S in the longitudinal direction is preferably at least this. Further, in order to maximize the cleaning effects, passing a transfer material S of a maximum sheet-passage width is even more preferable.

The type of the transfer material S used in the cleaning operation 2 may be paper such as plain paper, glossy paper, or the like. Alternatively, the transfer material S does not have to be paper, as long as there is no hindrance in transporting from the sheet feeding portion to the discharge portion, and toner on the photosensitive drum 1 can be suitably collected at the transfer portion. In the present embodiment, one sheet of Xerox Vitality Multipurpose Printer Paper (product name, basis weight 75 g/m$^2$), which is letter-size (widthwise 215.9 mm×lengthwise 279.4 mm) plain paper was passed.

Figure 8:
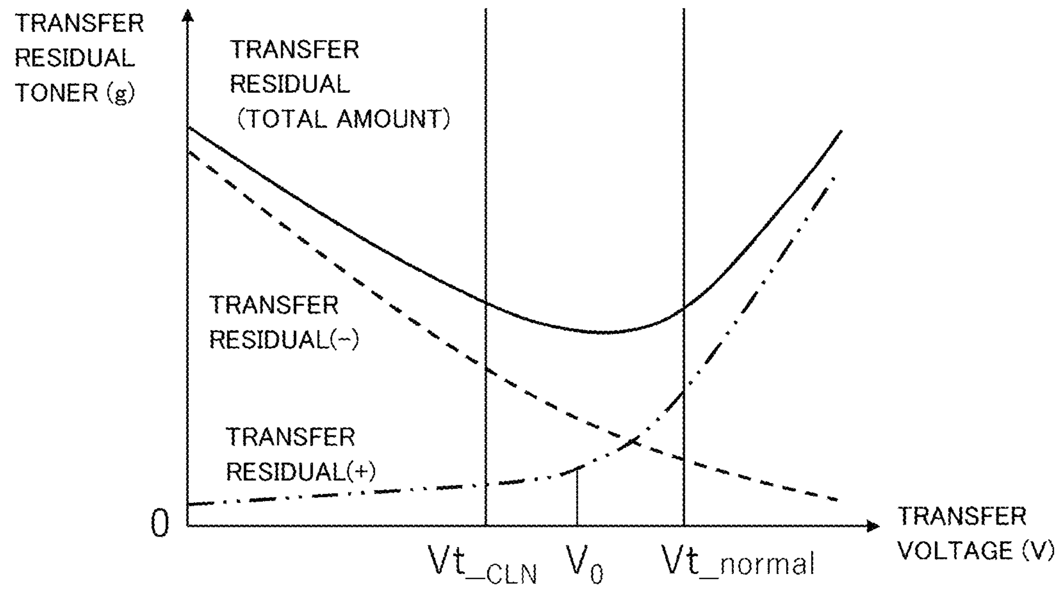
FIG. 8 is a diagram for describing a relation between amount of transfer residual toner and transfer voltage according to the first embodiment.

A relation between the transfer voltage Vt when performing the cleaning operation 2 and the transfer voltage Vt when performing normal sheet passage will be described with reference to FIG. 8. The horizontal axis in FIG. 8 is the transfer voltage Vt. The vertical axis shows the amount of transfer residual toner remaining on the photosensitive drum 1 when the transfer voltage Vt is changed, in a simplified manner. A case in which the surface potential of the photosensitive drum 1 facing the transfer roller 5 is 0 V is assumed. The amount of transfer residual toner that is charged to positive polarity is shown as transfer residual (+), the amount of transfer residual toner that is charged to negative polarity as transfer residual (−), and a total amount of transfer residual toner obtained by adding these two as transfer residual (total amount). Vt_CLN is transfer voltage when performing the cleaning operation 2, V0 is discharge starting voltage, and Vt_normal is transfer voltage at the time of sheet passage. As one example, Vt_CLN may be set to +500 V, V0 to +550 V, and Vt_normal to +1000 V.

Note that the brush voltage applied from the brush power source E4 to the brush member 11 in cleaning operations is preferably also controlled. The control unit 150 may control the brush voltage to, with respect to the drum potential (0 V), no more than discharge voltage, and also to the positive polarity side, for example. According to such a potential relation, toner of the regular polarity is collected on the inside of the brush member 11, and the toner of positive polarity is discharged. Discharging toner of positive polarity in advance in this way can prevent the charging roller 2 that is on the downstream side from the brush member 11 and to which voltage of negative polarity is applied at the time of sheet-passage operations from becoming soiled, at the time of performing sheet-passage operations after ending the cleaning operation.

It can be seen from FIG. 8 that transfer residual toner that is charged to positive polarity increases by discharge at the transfer portion J when the transfer voltage Vt is at least the discharge starting voltage V0. Conversely, transfer residual toner that is charged to negative polarity is reduced by raising the transfer voltage Vt.

During normal sheet passage that is not a cleaning operation, there is a need to transfer toner having charge of negative polarity, developed on the photosensitive drum 1, onto the transfer material S in a sure manner. Accordingly, transfer voltage Vt_normal needs to be set as high as possible. However, raising transfer voltage Vt leads to increase in transfer residual toner of positive polarity, as shown in FIG. 8. This transfer residual toner of positive polarity accumulates on the charging roller 2 and becomes a cause of image defects, but can be removed by performing the cleaning operation 1 periodically, and accordingly is tolerable to a certain level.

Conversely, transfer voltage Vt_CLN during the cleaning operation 2 is preferably a value that is lower than V0. Vt_CLN needs to be greater on the positive polarity side than the surface potential of the photosensitive drum 1 at the transfer portion J, in order to secure electrostatic repulsive force between the photosensitive drum 1 and the toner charged to negative polarity. The higher Vt_CLN is, the more toner charged to negative polarity can be transferred from on the photosensitive drum 1 to the sheet, but when Vt_CLN is higher than V0, transfer residual toner charged to positive polarity by the discharge at the transfer portion J will be generated. Upon reaching the charging roller 2, the transfer residual toner charged to positive polarity is electrically adsorbed by the charging roller 2. When developing filming is occurring and the present cleaning operation is being carried out, the toner adhering to the charging roller 2 needs to be cleaned as much as possible during the period of sheet passage. To this end, it is important that the amount of transfer residual toner of positive polarity adsorbed at the charging roller 2 is suppressed even if it means tolerating transfer residual toner of negative polarity that does not readily adhere to the charging roller 2. Accordingly, Vt_CLN preferably is voltage of positive polarity, which is the opposite polarity from the regular polarity of the toner, and is higher than 0 and has an absolute value that is no higher than V0.

The present embodiment is also applicable in a case of using an intermediate transfer member as the transfer member instead of the transfer material S. That is to say, cleaning operations the same as in the present embodiment can be carried out in an electrostatic transfer belt system or an intermediate transfer belt system that is adopted in color laser beam printers, as the intermediate transfer member, as well. In this case, the "transfer material S" above is equivalent to "electrostatic transfer belt" or "intermediate transfer belt". Thus, cleaning effects the same as those of the present embodiment can be obtained with respect to the charging roller 2. However, the toner that is relocated to the electrostatic transfer belt or the intermediate transfer belt is not discharged to the outside of the apparatus, but is accommodated in a waste toner container or the like. There is an upper limit to the capacity that a waste toner container can accommodate, and accordingly this point needs to be well considered in a case of performing charging member cleaning operations such as in the present embodiment with long-life models in particular.

5. Confirmation of Effects of Cleaning Operation

The following experiment was performed to confirm the effects of the cleaning operation. The image forming apparatus 100 according to the present embodiment was used, and printing two sheets was repeatedly performed in a high-temperature high-humidity environment of temperature of 32.5° C. and humidity of 90%. The image forming apparatus 100 was in a new state, the toner accommodation chamber 33 was filled inside with 50 grams of toner, and a text image pattern with coverage of 5% was used for the image. Talc paper was adopted as the transfer material S, and Century Star paper (product name, manufactured by Century Pulp and Paper) was used. 10,000 prints were passed, and checked for whether or not there were image defects. For checking for image defects, one print of an image in which nothing is printed (solid white image) was printed, and evaluated whether unintended toner appeared on the sheet. Note that when talc contained in talc paper becomes intermingled in the developing apparatus 3 and mixed with the toner, the talc robs the toner of electrons and becomes charged to negative polarity itself. As a result, the toner is not readily charged by friction, and readily adheres to the developing roller 31, and accordingly, developing filming readily occurs.

Figure 9A:
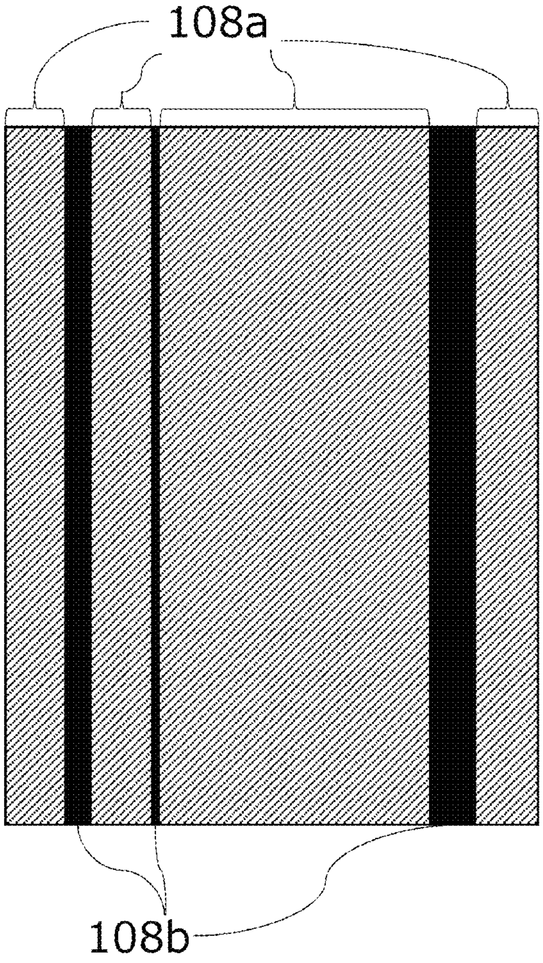
FIGS. 9A and 9B are diagrams for describing image defects due to toner soiling of the charging roller according to the first embodiment.

As a result, developing filming was confirmed to be occurring, and toner soiling of a concentration differing between portions where developing filming was occurring and portions where developing filming was not occurring was confirmed. FIG. 9A illustrates a typical example of image defects occurring on the transfer material S. Sign 108*a* denotes portions where there is no developing filming occurring (equivalent to solid white image). In these regions, toner adheres to the charging roller 2, the photosensitive drum 1 cannot be sufficiently charged, and sufficient Vback cannot be secured at the developing portion. Accordingly, the toner relocates from the developing roller 31 to the photosensitive drum 1, and is transferred to the transfer material S at the transfer portion, and therefore, toner soiling like a dark halftone is occurring.

Also, sign 108*b* denotes portions where there is developing filming occurring. Due to the developing filming, a great amount of toner is developed even in image non-formation portions. Part of this toner is transferred to the transfer material S during sheet passage, and image defects like solid black patterns are output.

Figure 9B:
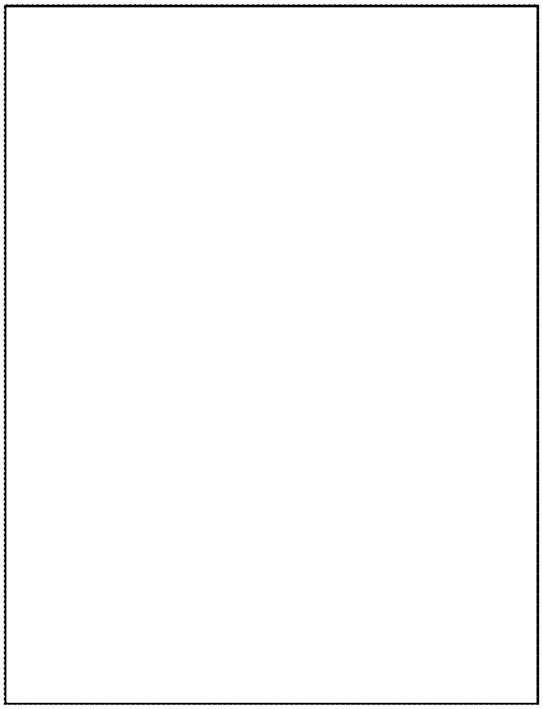

At this point, the cleaning operation 2 was carried out, and improvement was observed regarding image defects. FIG. 9B illustrates a typical image example following improvement regarding image defects. In the portions corresponding to the sign 108*a*, the dark halftone-like image defects disappeared. This is a result of toner with positive polarity adhering to the charging roller 2 in portions where no developing filming was occurring being changed to negative polarity, traveling to the photosensitive drum 1, and being recovered by the developing roller 31, and thus cleaning of the charging roller 2 was suitably performed.

Also, in the portions corresponding to the sign 108*b*, the solid black pattern-like image defects disappeared. This is a result of the surface of the clean photosensitive drum 1 from which toner was transferred to the transfer material S reaching the charging portion G, at portions where developing filming was occurring, with the charging roller 2 not becoming soiled during the cleaning operation, toner adhering to the charging roller 2 being charged again so as to facilitate relocation thereof to the photosensitive drum 1, and recovery of toner relocated to the photosensitive drum 1 from the charging roller 2, by a sheet, being enabled. Thus, cleaning of the charging roller 2 is suitably performed by carrying out the cleaning operation 2, and suitable images are obtained in subsequent jobs. Note that, when the cleaning operation 2 is performed, the toner that is on the developing roller 31 without being fixed thereto is discharged onto the transfer material S via the photosensitive drum 1. As a result, a layer of fixed toner is exposed, and accordingly effects are also obtained in which the fixed toner is removed a little at a time by regulation by the developing blade 34 and contact with the supply roller 32, and developing filming is resolved.

As described above, even when developing filming is occurring, toner adhering to the charging roller 2 can be suitably removed by carrying out the cleaning operation 2 of the charging member according to the present embodiment. As a result, it has been demonstrated that defective charging on the surface of the photosensitive drum 1 is suppressed, and image defects due to defective charging can be reduced. Note that this cleaning operation exhibits effects even when developing filming is not occurring.

Note that developing filming, which is a phenomenon in which a great amount of toner that is charged to regular polarity adheres to the developing roller 31, can also occur due to causes other that toner deterioration through endurance. For example, developing filming may occur in a case in which toner of a different type from the toner originally in the developing container being erroneously added thereto, as well. In this case as well, the cleaning operation 2 according to the present embodiment is effective.

Also, various types of operations including normal sheet passage, cleaning operation 1, cleaning operation 2, other cleaning operations, and so forth, should be carried out as appropriate in accordance with configurations and various types of conditions of apparatuses to which the present disclosure is applied, and these can be freely combined and carried out.

For example, control of carrying out cleaning operation 1, then performing determination of whether or not cleaning operation 2 is necessary by performing image determination through normal sheet passage, and carrying out cleaning operation 2 as necessary, enables consumption of sheets when cleaning operation 2 is unnecessary to be suppressed.

Second Embodiment

A second embodiment of the present disclosure will be described. The basic configuration and operations of an image forming apparatus 200 according to the present embodiment are the same as those in the first embodiment. Accordingly, components that are the same as or correspond to configurations and functions that the image forming apparatus 100 according to the first embodiment has are denoted by the same signs, and detailed description will be omitted.

The image forming apparatus 200 according to the present embodiment is a configuration that has no replacement members other than toner, with the toner being replenished by a user in accordance with the remaining toner amount. In the present embodiment, it is anticipated that effects of resolving developing filming can be obtained in addition to cleaning effects of the charging roller 2, by carrying out cleaning operation 2 following the timing of replenishing. Accordingly, toner soiling of the charging roller 2 can be suppressed from occurring, and accordingly image defects can be suppressed from occurring. Also, the frequency of cleaning operations of the charging roller 2 can be suppressed.

1. Image Forming Apparatus

Figure 10:
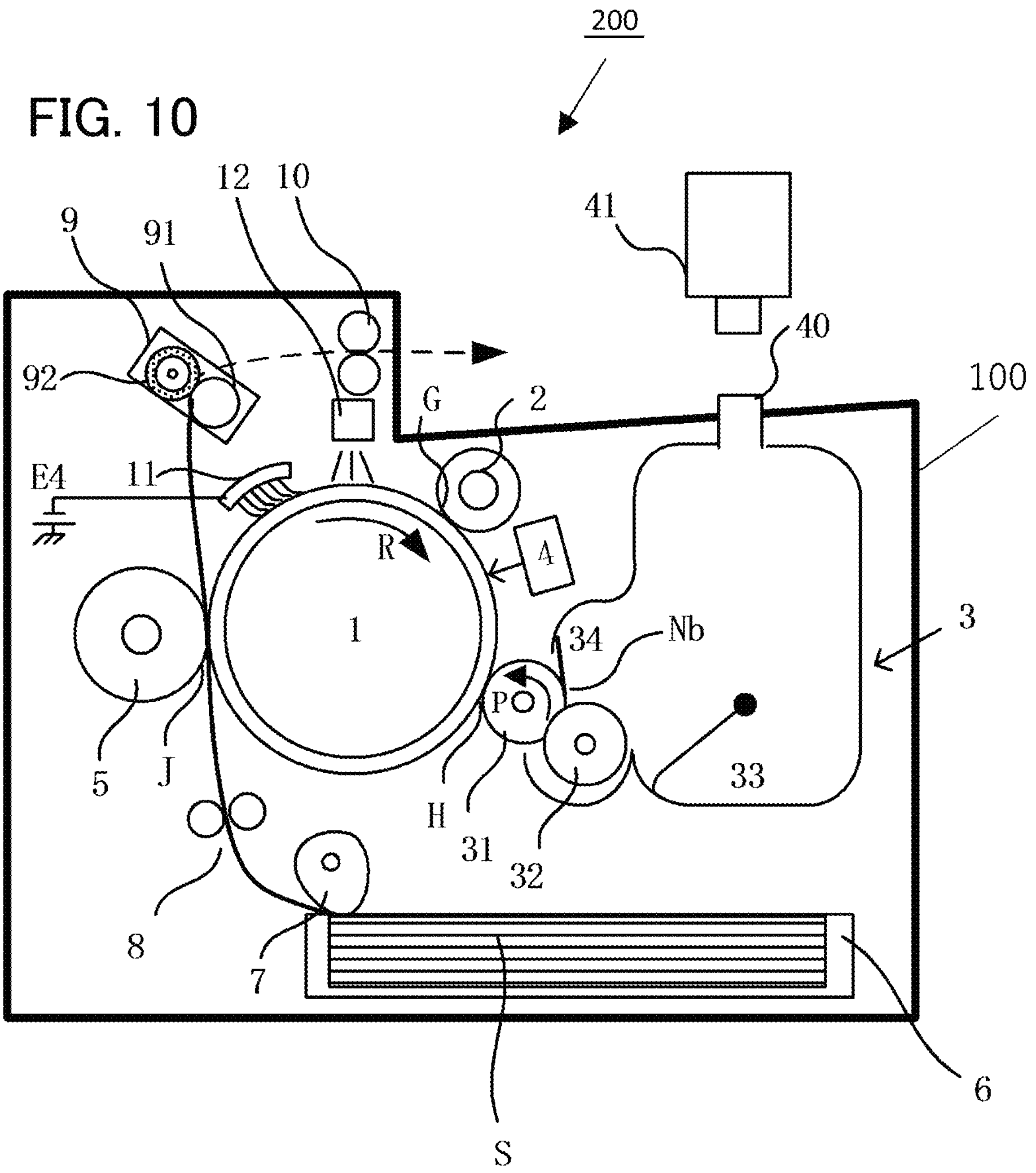
FIG. 10 is an explanatory diagram of an image forming apparatus according to a second embodiment.

As illustrated in FIG. 10, the image forming apparatus 200 according to the present embodiment is equipped with a toner replenishing mechanism 40 for replenishing toner to the toner accommodation chamber 33. Users can replenish the toner accommodation chamber 33 with new toner at an optional timing, using the toner replenishing mechanism 40. A toner pack 41 (toner replenishing container) is mounted to the toner replenishing mechanism 40. The toner pack 41 is a container that is detachably mountable to the image forming apparatus 200. Note that, while the toner pack 41 is mounted to the image forming apparatus 200 in the present embodiment, the toner pack 41 may be directly mounted to the toner accommodation chamber 33. Also, the toner replenishing container is not limited to the toner pack 41, and may be in a form such as a toner bottle. Further, the form, configuration, and connecting location of the toner replenishing container are not limited, as long as capable of replenishing toner. Also, in the configuration according to the present embodiment, in a case in which replenishing is completed, the toner pack 41 is removed and image formation is carried out, but a configuration may be made in which information forming can be performed in a state in which the toner pack 41 is mounted.

In the present embodiment, a system is adopted in which toner is replenished by a user from the toner pack 41 filled with toner for replenishing (direct replenishing system). Accordingly, work for replacing the toner accommodation chamber 33 that is the developing container when the remaining toner amount in the toner accommodation chamber 33 is low becomes unnecessary, and accordingly usability can be improved. Note that the image forming apparatus 200 and the toner pack 41 make up an image forming system.

2. Cleaning Operation of Charging Member

In the present embodiment, in a situation in which developing filming is occurring, cleaning operation 2 is carried out following performing toner replenishment. Accordingly, developing filming is resolved, in addition to the charging roller 2 being cleaned, which will be described below.

In the cleaning operation 2, the toner on the photosensitive drum 1 is removed at the transfer portion J by sheet passage. The surface of the photosensitive drum 1, following toner being removed, thereafter reaches the charging portion G, charges the toner of positive polarity adhering upon the charging roller 2 to negative polarity, and performs recovery thereof on the photosensitive drum 1. Further, at the developing portion H, the great amount of toner that is adhering to the developing roller 31 and causing developing filming relocates to the photosensitive drum 1. Thus, the toner fixed to the developing roller 31 is exposed. This enables the fixed toner to be removed by regulating by the developing blade 34 and rubbing of the supply roller 32 and the developing roller 31. The developing filming is resolved through these operations. Thus, carrying out the cleaning operation 2 following toner replenishment can resolve development filming and toner soiling of the charging roller 2.

Note that, in a state in which developing filming is occurring, carrying out the cleaning operation 2 prior to replenishing toner will not resolve the developing filming. Now, in a case, in which the cleaning operation 2 is carried out prior to replenishing the toner, the great amount of toner that is adhering to the developing roller 31 and causing developing filming is relocated to the photosensitive drum 1 at the developing portion H. Thus, the toner fixed to the developing roller 31 is exposed, and there are effects of removal thereof by regulating by the developing blade 34 and rubbing of the supply roller 32 and the developing roller 31. However, and the point in time prior to replenishing toner, there is a great amount of toner present in the toner accommodation chamber 33 that is deteriorated and readily adheres to the developing roller 31. Accordingly, a greater amount of toner becomes fixed to the developing roller 31 than the amount of toner that is removed by the cleaning operation 2, and developing filming cannot be resolved.

Conversely, following toner replenishment, a great amount of new toner is supplied into the toner accommodation chamber 33, and the proportion of deteriorated toner is markedly reduced. Accordingly, in a case of carrying out the cleaning operation 2, the toner fixed to the developing roller 31 can be removed, and also toner can be suppressed from being fixed to the developing roller 31 again (i.e., developing filming).

As described in the embodiments above, in the image forming apparatus using the drum cleaner-less system, the transfer material S such as paper or the like is made to pass through the transfer portion in cleaning operations of the charging roller 2. Accordingly, even when a great amount of toner charged to regular polarity is adhering to the developing roller 31, the toner adhering to the charging roller 2 can be suitably removed. As a result, defective charging of the surface of the photosensitive drum 1 can be suppressed, and resultant image defects can be reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-039600, filed on Mar. 14, 2024, which is hereby incorporated by reference herein in its entirety.

What is claimed is:

1. An image forming apparatus, comprising:

an image bearing member configured to be rotatable;

a charging member configured to come into contact with the image bearing member and form a charging portion, and charge a surface of the image bearing member at the charging portion;

a developing member configured to be rotatable and come into contact with the image bearing member and form a developing portion, and form a toner image by developing an electrostatic latent image that is formed on the surface of the image bearing member on the basis of image information, by supplying toner charged to a regular polarity to the surface of the image bearing member at the developing portion;

a transfer member configured to face the image bearing member, form a transfer portion together with the image bearing member, and transfer the toner image from the image bearing member to a recording material at the transfer portion;

a charging voltage applying unit configured to apply charging voltage to the charging member;

a developing voltage applying unit configured to apply developing voltage to the developing member;

a transfer voltage applying unit configured to apply transfer voltage to the transfer member; and a control unit configured to control the charging voltage applying unit, the developing voltage applying unit, and the transfer voltage applying unit, wherein following the toner image, which is formed on the surface of the image bearing member at the transfer portion, being transferred to the recording material, toner remaining on the surface of the image bearing member is recovered by the developing member, wherein the control unit is configured to carry out an image forming operation of forming the toner image developed from the electrostatic latent image on the recording material, and a cleaning operation of cleaning the charging member, wherein the cleaning operation includes a first cleaning operation and a second cleaning operation, and is executed at a timing of executing an image non-formation operation that is different from the image forming operation, wherein in the first cleaning operation, toner adhering to the charging member is recovered by the developing member, and wherein in the second cleaning operation, the toner adhering to the charging member is discharged to the recording material passing through the transfer portion.

2. The image forming apparatus according to claim 1, wherein the control unit performs control in the first cleaning operation such that the developing voltage is a polarity opposite to the regular polarity, and the charging voltage is the regular polarity and also is not higher than a discharge starting voltage, and performs control in the second cleaning operation such that the developing voltage is opposite polarity to the regular polarity, the transfer voltage is opposite polarity to the regular polarity, and the charging voltage is the regular polarity.

3. The image forming apparatus according to claim 1, wherein the control unit performs control in the second cleaning operation such that the transfer voltage is lower than a discharge starting voltage.

4. The image forming apparatus according to claim 1, further comprising:

a static eliminating member that is disposed on a downstream side of the transfer portion and also on an upstream side of the charging portion, with respect to a rotation direction of the image bearing member, and that is configured to perform static elimination of the surface of the image bearing member, wherein the control unit performs static elimination of the surface of the image bearing member by the static eliminating member in the cleaning operation.

5. The image forming apparatus according to claim 1, further comprising:

a toner accommodating unit configured to accommodate toner that is for the developing member to supply to the developing portion, wherein the toner accommodating unit is replenished with toner from a toner replenishing container, and the control unit performs control to execute the cleaning operation when the toner accommodating unit is replenished with toner from the toner replenishing container.

6. The image forming apparatus according to claim 1, wherein the recording material is discharged from the image forming apparatus following an image being transferred thereto.

* * * * *